United States Patent

[11] 3,610,654

| [72] | Inventor | Jorge Torres<br>Newbury Park, Calif. |
|---|---|---|
| [21] | Appl. No. | 831,182 |
| [22] | Filed | June 6, 1969 |
| [45] | Patented | Oct. 5, 1971 |
| [73] | Assignee | Purolator, Inc.<br>Newbury Park, Calif. |

[54] FLEXIBLE COUPLING
16 Claims, 6 Drawing Figs.

[52] U.S. Cl.................................................. 285/106,
285/166, 285/233, 285/373, 277/71
[51] Int. Cl......................................................... F16l 17/04
[50] Field of Search........................................... 285/233,
373, 112, 166, 106, 115; 277/71, 207 A

[56] References Cited
UNITED STATES PATENTS

| 1,925,335 | 9/1933 | Murphy | 285/166 X |
|---|---|---|---|
| 2,826,437 | 3/1958 | Detweiler et al. | 285/233 |
| 2,918,313 | 12/1959 | Lazar et al. | 285/233 X |
| 2,956,820 | 10/1960 | De Cenzo | 285/233 X |
| 2,967,723 | 1/1961 | Willis | 285/233 |
| 2,971,781 | 2/1961 | Torres | 285/233 |
| 3,113,791 | 12/1963 | Frost et al. | 285/373 X |
| 3,405,957 | 10/1968 | Chakroff | 285/233 X |
| 3,495,853 | 2/1970 | Furrer | 285/373 X |

FOREIGN PATENTS

| 1,139,128 | 2/1957 | France | 285/106 |
|---|---|---|---|
| 911,444 | 5/1954 | Germany | 285/106 |
| 560,684 | 4/1957 | Italy | 285/106 |

*Primary Examiner*—Thomas F. Callaghan
*Attorney*—Smyth, Roston & Pavitt

ABSTRACT: This disclosure describes a flexible duct coupling for use in interconnecting two duct sections for relative pivotal movement. The coupling includes first and second bearings mounted on the first and second duct sections, respectively, a retainer extending between the bearings for interconnecting the duct sections and seal means for sealing the region between the ends of the duct sections.

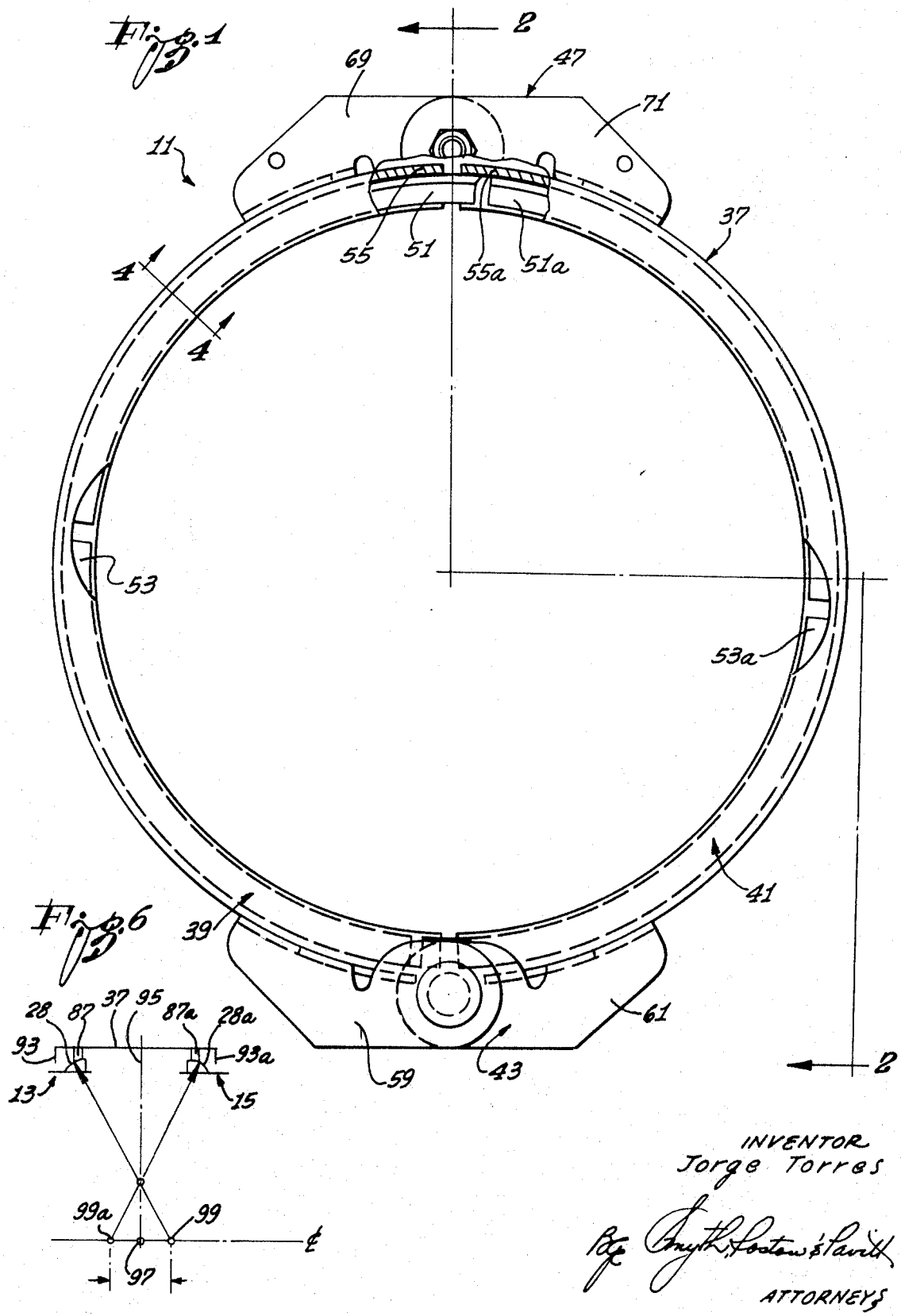

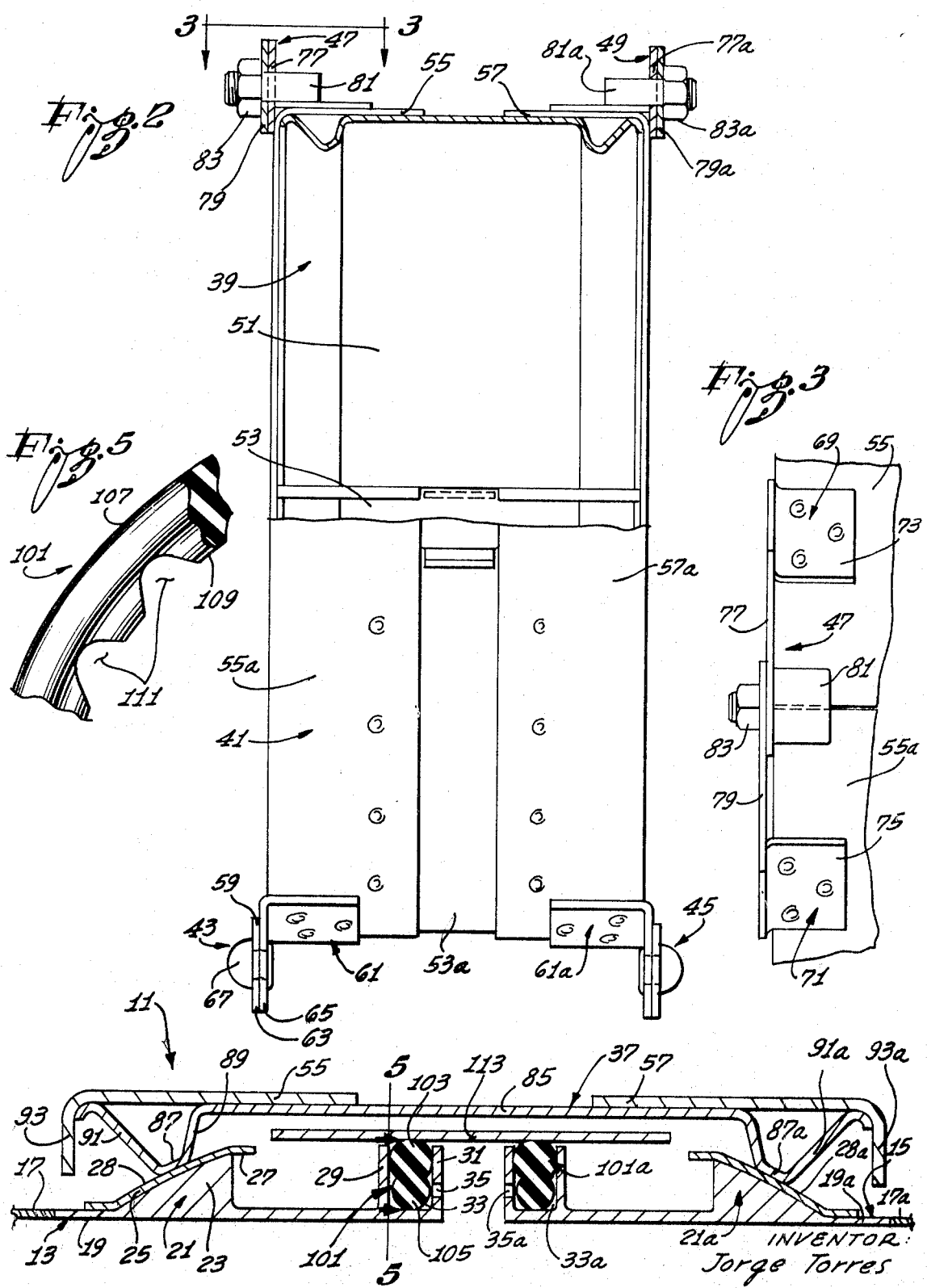

FLEXIBLE COUPLING

BACKGROUND OF THE INVENTION

This invention relates to a flexible duct coupling of the type disclosed in common assignee's copending application Ser. No. 714,593 now U.S. Pat. No. 3,540,758.

Large modern air craft have ducts for carrying air under pressure to pressurize the cabin. The ducts are provided in relatively long, individual sections which must be suitably interconnected. Due to the flexing of the aircraft in flight, the air pressure within the ducts and dimensional variations brought about by temperature fluctuations, a flexible coupling must be used to join the adjacent duct sections. Not only must the coupling be capable of allowing the requisite relative movement between adjacent duct sections, but it also must be capable of operation at high temperatures ranging up to approximately 450° F.

A flexible coupling of the type to which the present invention is directed may include first and second bearings mounted on the first and second duct sections, respectively, a retainer extending between the bearings and engageable therewith to interconnect the duct sections for relative pivotal movement and seal means for sealing the region between the confronting ends of the duct sections. When one duct section pivots relative to the other duct section, the relative pivotal movement may be accommodated by either or both ends of the coupling. With prior art devices, only one side of the coupling may pivot until the retainer tends to slip off of the bearing. As the retainer nears the end of the bearing, further flexure results in point contact between the bearing and retainer and may result in the duct section becoming disengaged from the coupling. This result may occur even though the other side of the coupling would accommodate additional relative pivotal movement. Another problem with couplings of this type is to maintain maximum strength while keeping the weight of the coupling at a minimum. The strength requirements become more significant as the duct section diameter increases and as the temperature and pressures of the air carried by the duct sections increases. Minimum weight is important because the coupling is particularly designed for use in aircraft where excessive weight is very detrimental.

Many duct couplings of this type employ sealing rings for use in sealing between the ends of the duct. The high temperatures and pressures of the air in the ducts and the relative movement between the parts of the coupling makes the formation of an effective, nonextrudable seal most difficult.

SUMMARY OF THE INVENTION

The present invention solves the problem of the duct section tending to snap out of the coupling as a result of one side of the coupling accommodating excessive duct movement by positively limiting the amount of angular movement which each side of the coupling can safely accommodate. By so doing, any additional pivotal movement will be accommodated by the other side of the coupling.

This can be advantageously accomplished by providing a flange at each end of the retainer with the flange projecting toward the adjacent duct section. The length of the flange is selected so that the end of the flange will engage the duct section at approximately the same time that the retainer nears the end of the bearing surface. This engagement between the end of the flange and the duct section limits the maximum amount of relative pivotal movement which can be accommodated by that end of the coupling and requires that further relative pivotal movement be accommodated by the opposite end of the coupling. Of course, the coupling is designed to accommodate the maximum amount of flexure which will normally be expected to occur during actual flight of the aircraft.

The retainer preferably has a sleeve portion which circumscribes the end portions of the duct sections and first and second retainer portions defining retainer surfaces which engage the bearings on the duct sections. Each of the retainer portions has a component which extends radially of the duct section. When the ducts are pressurized, they tend to separate axially and are prevented from so doing by the retainer. However, placing of the duct sections in tension tends to bend the radially extending portions of the retainer outwardly and if this were to occur, the duct sections would become disengaged from the retainer.

To prevent this, the present invention provides a reinforcing member having a first portion connected to the sleeve and a second portion lying axially outwardly of the adjacent retainer portion. A strut member extends between the retainer portion and reinforcing member to permit the reinforcing member to prevent outward bending of the retainer. The reinforcing member, the retainer portion and the strut member define a hollow rib which at least substantially circumscribes the duct section. Preferably, the reinforcing member provides not only the reinforcing function, but also includes the flange which performs the function of flexure limiting described hereinabove.

To facilitate installation and removal of the retainer from the duct sections, the retainer is preferably provided in two half sections which are hingedly joined at one end and which can be releasably interconnected at the other end. Because of the sloping contour of the bearing surfaces, placing of the duct sections in tension tends to bulge the end portions of the retainer. To further improve the strength of the retainer, at least one of the fasteners for releasably connecting the retainer sections includes first and second fastener elements on the two half sections, respectively. The two fastener elements are joined together axially outwardly of the adjacent retainer surface. This prevents the end portion of the retainer from bulging outwardly or flaring outwardly as a result of placing of the duct sections in tension.

To seal the ends of the duct section, the present invention provides sealing rings on each of the duct sections which preferably engage a floating sleeve. However, for some applications, the floating sealing sleeve can be eliminated and the seals can engage the retainer directly. To improve the fluid tightness of the seal, the sealing rings are preferably dynamically loaded by the fluid pressure within the ducts. To improve the dynamic loading of the seal, the inner periphery of the seal is formed with notches which permits the fluid pressure to act on both sides of the seal to thereby urge the seal radially outwardly in an even manner. If pressure were to act on only one side of the seal, the seal ring might become tilted and this would increase wear of the seal and the tendency of the seal to extrude.

The present invention teaches that it is important to keep the sealing ring concentric with the sealing surface which it engages. In order to accomplish this, the notches should be equally spaced, of substantially equal length, and must not extend circumferentially for too great a distance. Each of these three factors individually contributes to maintaining the seal ring concentric. If the seal ring were permitted to become nonconcentric with the sealing surface, the sealing surface might forcibly strike and slide against the seal ring channel and the tendency of the seal to leak would be increased.

The seal has a zone of maximum width in axial cross section, and this zone sealingly engages the wall of the seal groove. The notches should extend radially outwardly from the inner periphery of the seal and terminate a location lying radially inwardly of this zone. If the notches were permitted to penetrate this zone, the seal would leak.

Another advantage of the notches is that they provide room for expansion of the material of the seal ring when the seal is used for high temperature service. Additional expansion space can be provided by reducing the width of the seal ring (as viewed in axial cross section) radially inwardly of the zone of maximum thickness.

Although the sealing ring and the seal assembly of this invention are particularly adapted for use with a flexible duct coupling, they may be utilized in other environments.

The invention, both as to its organization and method of operation, together with further features and advantages thereof, may be understood by reference to the following

3 description taken in connection with the accompanying drawings.

BRIEF DESCRIPTION OF THE DRAWINGS

FIG. 1 is a side elevational view of the coupling constructed in accordance with the teachings of this invention.

FIG. 2 is an end elevational view partially in section of the retainer and taken generally along line 2—2 of FIG. 1.

FIG. 3 is a fragmentary plan view taken generally along line 3—3 of FIG. 2.

FIG. 4 is an enlarged sectional view taken generally along line 4—4 of FIG. 1.

FIG. 5 is an enlarged fragmentary side elevational view taken generally along line 5—5 of FIG. 4 and illustrating a fragment of the preferred form of O-ring seal.

FIG. 6 is a schematic view illustrating the preferred center-to-center relationship of the bearing surfaces.

DESCRIPTION OF THE PREFERRED EMBODIMENT

Referring to the drawings and in particular to FIG. 1 thereof, reference numeral 11 designates a flexible duct coupling constructed in accordance with the teachings of this invention. In the embodiment illustrated, the coupling 11 is used to flexibly interconnect hollow duct sections 13 and 15 (FIG. 4) which form a part of an air-conducting system. The duct sections 13 and 15 are particularly adapted for installation in an aircraft and for carrying air under pressure to pressurize the cabin thereof.

The coupling 11 is symmetrical about a central radially extending line and accordingly, only one-half of the coupling is described in detail with corresponding reference characters followed by the letter *a* being utilized to designate corresponding parts. The duct section 13 includes a duct segment 17 (FIG. 4) having a ferrule 19 suitably secured thereto as by welding. Although use of the ferrule 19 is preferred, for some applications, the ferrules may be eliminated. For this reason, the expression "duct section" is used herein to include either or both of the ferrule 19 and the duct segment 17.

The ferrule 19 is preferably constructed of titanium and has a circumferentially extending bearing 21 thereon. The bearing 21 includes a continuous circumferentially extending bearing support 23 which is formed integrally with the ferrule 19 and a bearing member 25 in the form of a thin sleeve conforming generally to the contour of the bearing support 23. The bearing member 25 is mounted on the bearing support 23 in any suitable manner and includes a bearing member extension 27 which extends axially inwardly beyond the inner end of the bearing support 23.

The ferrule 19 has two annular, axially spaced walls 29 and 31 defining therebetween a radially outwardly opening annular seal groove 33. The wall 31 has one or more ports 35 providing communication between the interior of the ferrule 19 and the interior of the seal groove 33.

The bearing 21 has a bearing surface 28 which is preferably part spherical and is therefore arcuate in axial cross section as shown in FIG. 4. The bearing surface 28 slopes radially inwardly as it extends axially outwardly.

The duct sections 13 and 15 are retained against axial separation by a retainer 37. The retainer 37 is constructed to achieve maximum strength while minimizing weight. The retainer 37 includes half-sections 39 and 41 (FIGS. 1 and 2) hinged together at one set of ends by hinges 43 and 45 and releasably joined at their opposite ends by fasteners 47 and 49. The half-section 39 includes two sheet metal central sections 51 and 53, each of which extends for approximately 90° and a pair of 180° peripheral bands 55 and 57. The central sections 51 and 53 are welded to the peripheral bands 55 and 57. The half-section 41 is substantially identical and corresponding parts are designated by corresponding reference characters followed by the letter *a*.

The hinge 43 includes a pair of metal straps 59 and 61 (FIGS. 1 and 2) welded respectively to the bands 55 and 55*a*.

4

The straps 59 and 61 have confronting portions 63 and 65, respectively, which lie axially outwardly of the bands 55 and 55*a* as shown in FIG. 2. A rivet 67 extends through the confronting portions 63 and 65 to permanently hinge the half-sections 39 and 41 together. The hinge 45 is identical to the hinge 43 and corresponding parts are designated by corresponding reference characters followed by the letter *a*.

The fastener 47 (FIGS. 1, 2 and 3) includes a pair of straps 69 and 71 having attachment portions 73 and 75, respectively, welded to the bands 55 and 55*a*. The straps 69 and 71 have upstanding confronting portions 77 and 79, respectively, which extend at right angles with respect to their respective attachment portions. The confronting portions 77 and 79 lie axially outwardly of the bands 55 and 55*a* and are releasably interconnected by a bolt 81 and a nut 83. The bolt 81 has a wide head which is engageable with the bands 55 and 55*a* to prevent rotation thereof during tightening of the nut 83. The fastener 49 is identical to the fastener 47 and corresponding parts are designated by corresponding reference characters followed by the letter *a*.

As viewed in axial cross section (FIGS. 2 and 4) the retainer 37 has a sleeve portion 85 extending between the bearings 21 and 21*a*, a retainer portion 87 engaging the bearing surface 28, a connecting portion 89 integrally joining the sleeve portion and the retainer portion and a strut portion 91 with all of these portions being formed by the central sections 51, 51*a*, 53 and 53*a*. The right-hand end of the retainer 37 as viewed in FIG. 4 is identical to the left end and corresponding parts are designated by corresponding reference characters followed by the letter *a*. The retainer portion 87 has a surface which preferably generally conforms to the bearing surface 28 and which engages the bearing surface 28. Thus, the retainer portion 87 slopes radially inwardly as it extends axially outwardly. In the embodiment illustrated, the connecting portion 89 extends in a direction having a substantial radial inward component while the strut portion 91 extends radially and axially outwardly from the outer ends of the retainer portion 87.

When the duct sections 13 and 15 are pressurized, they tend to separate axially and because of the slope of the bearing surfaces 28 and 28*a* and the retainer portions 87 and 87*a*, the ends of the retainer 37 tend to bulge outwardly. The bands 55, 55*a*, and 57 and 57*a* cooperate with the strut portions 91 and 91*a* to resist this outward bulging tendency. Specifically, each of the bands 55 and 57 are generally L-shaped in axial cross section with one leg of the L being welded to the sleeve portion 85. The other leg of the bands 55 and 55*a* form a substantially continuous annular flange 93 while a similar flange 93*a* is formed by the bands 57 and 57*a*. As shown in FIG. 4, the strut portion 91 extends outwardly and engages the flange 93 adjacent the apex of the band 55. The strut portion 91*a* similarly engages the flange 93*a*. In this fashion the bands 55, and 55*a*, and 57 and 57*a* reinforce the retainer against bulging.

The flanges 93 and 93*a* extend circumferentially of the duct sections 13 and 15, respectively, and are engageable therewith upon a predetermined amount of pivotal movement between the duct sections to thereby limit the amount of deflection which each side of the coupling can accommodate. For example, pivotal movement of the duct section 13 in a direction causing the ferrule 19 to engage the flange 93 would be halted upon such engagement, Further upward pivotal movement of the left end of the ferrule 19 would also elevate the left end of the retainer 37 and thereby cause the right end of the retainer to move downwardly toward the ferrule 15. In this manner, the additional upward pivotal movement of the left end of the ferrule 19 would be accommodated by the right half of the coupling as shown in FIG. 4.

As more fully explained in common assignee's copending application Ser. No. 714,593, the bearing surfaces 28 and 28*a* are preferably spherical and lie on opposite sides of a radial plane 95 (FIG. 6) which extends through the center 97 of the coupling. Thus, the bearing surface 28 has a center 99 and the bearing surface 28*a* has a center 99*a* and these centers lie on the side of the plane 95 opposite to the side of the plane on which their respective bearing surface lies. This allows the coupling to have a relatively short axial dimension and allows the coupling to accommodate a significant amount of initial radial misalignment. This ball joint type construction allows the retainer portions 87 and 87a to slide on the cooperating bearing surfaces 28 and 28a and to eliminate point contact thereon. Furthermore, the contact between the bearing and retainer surfaces extends circumferentially of the duct section for approximately the full 360°.

Identical O-ring-type seals 101 and 101a (FIG. 4) are positioned within the seal grooves 33 and 33a. The seal 101 is constructed of a resilient elastomeric material, and as viewed in axial cross section, includes a relatively wide outer region 103 and a relatively narrow inner region 105. As shown in FIG. 5, the seal 101 has an outer periphery 107 and an inner periphery 109. A plurality of notches 111 extend radially outwardly form the inner periphery 109. The notches 111 are preferably of identical size and shape and are equally spaced around the inner periphery 109 of the seal 101. In the embodiment illustrated, each of the notches 111 extends radially outwardly through the full radial thickness of the inner region 105. The even spacing of the notches 111 and their corresponding configurations causes the seal 101 to remain concentric with the duct section on which it is mounted.

The widest zone of the outer region 103 sealingly engages the walls 29 and 31. The axial thickness of the seal 101 is greater than the depth of the groove 33 so that the outer periphery 107 lies radially outwardly of the seal groove 33.

For the seals 101 and 101a to be effective, it is essential that a sealing member engage the seals and span the gap therebetween. For some applications, this function can be performed by the retainer or other suitable means; however, for many applications it is preferred to utilize a floating sealing sleeve 113. The sleeve 113 is of the type described in said copending application and is constructed of thin lightweight metal. The sleeve 113 moves or floats with the seals 101 and 101a independently of the retainer 37 and performs no retaining function. The gap between the sleeve 113 and the radial outward ends of the walls 29 and 31 are selected so as to prevent extrusion of the seal 101 therethrough.

When the duct sections 13 and 15 are not pressurized, the seals 101 and 101a sealingly engage the walls of their respective seal grooves 33 and 33a and the floating sealing sleeve 113. When the duct sections 13 and 15 are pressurized, air under pressure flows through the ports 35 and 35a to act on the seals 101 and 101a, respectively. Dynamically loading the seals 101 and 101a causes them to tightly sealingly engage the walls of their respective grooves and the floating sealing sleeve 113. The fluid pressure passes through the notches 111 and acts evenly on both sides of the seal 101. Should the fluid be hot, the excess space provided in the groove 33 by the notches 111 and the relatively small inner region 105 is utilized to accommodate thermal expansion of the seal.

Another effect of pressurization of the duct sections 13 and 15 is that it places the duct sections in tension thereby tending to separate them. The duct sections 13 and 15 are, however, held against axial separation by the retainer 37 and this, as described above, tends to bulge the ends of the retainer outwardly. This outward bulging tendency is resisted by the strut portions 91 and 91a and the flanges 93 and 93a. Specifically, the bulging force is transmitted from the retainer portion 87 through the strut portion 91 to the bands 55 and 55a which are welded to the central portion 85. In this manner, the bands resist the bulging tendency of the retainer 37.

To maximize the resistance to bulging at the ends of the half-sections 39 and 41, the confronting portions of the fasteners 47 and 49 and of the hinges 43 and 45 are located axially outwardly of the adjacent retainer portions 87 and 87a (FIG. 2). Specifically, these confronting portions are located just axially outwardly of the flanges 93 and 93a, respectively.

The coupling 11 accommodates relative angular movement between the duct sections 13 and 15 as well as axial movement of the duct sections toward and away from each other. The duct sections 13 and 15 pivot about the centers 99 and 99a (FIG. 6), respectively. The flanges 93 and 93a limit the pivotal movement of each half of the duct section.

Although a specific embodiment of the invention has been shown and described, many changes, modifications, and substitutions may be made by one having ordinary skill in the art without necessarily departing from the spirit and scope of this invention.

I claim:

1. A flexible coupling for interconnecting first and second duct sections having confronting end portions and being pressurizable to place the duct sections in tension comprising:
   first and second members on said first and second duct sections, respectively;
   a retainer having a sleeve portion extending between said members and surrounding the end portions of the duct sections, said retainer having first and second retainer portions with the first retainer portion extending in a direction having a component radially of the duct sections, said first and second retainer portions being engageable with said first and second members, respectively, to prevent axial separation of the duct sections when the duct sections are pressurized, the tensile force developed as a result of pressurization of the duct sections tending to bend the first retainer portion outwardly;
   said retainer including a reinforcing member affixed to said sleeve portion, at least a portion of said reinforcing member lying outboard of a region of said first retainer portion, said retainer including a strut member extending between said region of said first retainer portion and said portion of said reinforcing member to resist the bending tendency of said first retainer portion in response to duct pressurization; and
   seal means for sealing the region between the end portions of the duct sections.

2. A coupling as defined in claim 1 wherein said reinforcing member and said strut member define a hollow rib which extends circumferentially of said retainer.

3. A coupling as defined in claim 1 wherein said reinforcing member includes a first section mounted on said sleeve portion and a radial section projecting generally radially inwardly outboard of said retainer portion with said radial section of said reinforcing member engaging said strut member to thereby reinforce the retainer against bending as a result of duct pressurization.

4. A coupling for interconnecting first and second conduits wherein the conduits are adapted to carry fluid under pressure, said coupling comprising:
   first wall means for defining a first seal groove on said first conduit;
   second wall means for defining a second seal groove on said second conduit;
   first and second resilient seal rings in said first and second grooves, respectively;
   said first seal ring in axial cross section having a relatively wide first zone at which the seal sealingly engages said first wall means and a second zone radially inwardly of said first zone, the width of said seal ring at said second zone being less than at said first zone when the seal is unstressed, said seal ring having a plurality of notches formed in the inner periphery thereof with each of said notches extending radially outwardly and terminating radially inwardly of said first zone;
   said first wall means having an aperture therein for permitting the fluid in at least one of said conduits to enter said first groove to pressure load said first seal ring, the fluid passing through said notches to act on both sides of said first seal ring;
   means for engaging the outer peripheries of said seal rings and spanning the gap therebetween to thereby sealingly join the first and second conduits; and
   means for interconnecting the conduits to prevent axial separation thereof.

5. A coupling as defined in claim 4 wherein said means for engaging said seal rings includes a floating sealing sleeve which surrounds said seal rings in sealing engagement therewith and said means for interconnecting includes a retainer which circumscribes said floating sealing sleeve, said floating sealing sleeve being movable independently of said retainer.

A coupling as defined in claim 4 wherein said notches are evenly spaced circumferentially of the seal ring and each of said notches extends circumferentially of the seal ring for substantially equal distances.

7. A coupling as defined in claim 4 wherein said first seal ring in axial cross section has outer and inner generally circular lobes generally defining a FIG. 8 configuration with said outer lobe containing said first zone with said inner lobe being of lesser diameter than said outer lobe, said notches being formed in said inner lobe to thereby at least partially interrupt said inner lobe at a plurality of locations around the inner periphery of the first seal ring whereby the relatively small inner lobe and the notches provide a space into which the material of the seal ring can expand when the fluid transmitted through the conduits is relatively hot.

8. A coupling for interconnecting first and second duct sections adapted to carry fluid under pressure comprising:
first wall means defining a first seal groove on said first duct section;
second wall means defining a second seal groove on said second duct section;
first and second seal rings in said first and second seal grooves, respectively;
means sealingly engaging the outer peripheries of said seal rings and spanning the gap therebetween;
first and second bearings, said first bearing have a bearing surface which is arcuate in axial cross section and which has its center substantially on the axis of said first and second duct sections; and
a retainer including first and second retainer portions engageable, respectively, with said bearing surface and said second bearing for interconnecting said duct sections for pivotal movement relative to said retainer, said retainer including a flange projecting toward said first duct section to thereby limit the relative pivotal movement which can occur between said first section and said retainer and a strut portion extending between said first retainer portion and said flange whereby said flange strengthens said first retainer portion.

9. A coupling as defined in claim 8 wherein one of said seal rings has a scalloped inner periphery and the wall means defining the seal groove for said one seal ring has an aperture therein to admit fluid under pressure from the duct sections to the seal groove to permit dynamic loading of said one seal ring.

10. A flexible coupling for interconnecting first and second duct sections wherein tee duct sections are movable relative to each other, said coupling comprising:
first and second bearings on the first and second duct sections, respectively;
a retainer extending between said duct sections and having first and second retainer portions engageable with the first and second bearings, respectively, to retain said duct sections against axial separation;
seal means for sealing the region between the duct sections;
said first bearing and said first retainer portion being cooperable to permit relative pivotal movement between said retainer and said first duct section about an axis which is generally transverse to the first duct section;
said second bearing and said second retainer portion being cooperable to permit relative pivotal movement between raid retainer and said second duct section about an axis which is generally transverse to the second duct section;
means other than said retainer portions on at least one of said retainer and said first duct section for limiting the maximum amount of said relative pivotal movement between said retainer and said first duct section whereby further relative pivotal movement between said duct sections must be accommodated by said second bearing an said second retainer portion; and
said seal means including wall means defining a seal groove on said first duct section and a seal ring in said seal groove, said ring having at least one notch in the inner periphery thereof, said wall means having aperture therein to permit pressure loading of said seal ring.

11. A flexible coupling for interconnecting first and second duct sections wherein the duct sections are movable relative to each other, said coupling comprising:
first and second bearings on the first and second duct sections, respectively;
a retainer extending between said duct sections and having first and second retainer portions engageable with the first and second bearings, respectively, to retain said duct sections against axial separation;
seal means for sealing the region between the duct sectons;
said first bearing and said first retainer portion being cooperable to permit relative pivotal movement between said retainer and said first duct section about an axis which is generally transverse to the first duct section;
said second bearing and said second retainer portion being cooperable to permit relative pivotal movement between said retainer and said second duct section about an axis which is generally transverse to the second duct section;
means other than said retainer portions on at least one of said retainer and said first duct section for limiting the maximum amount of said relative pivotal movement between said retainer and said first duct section whereby further relative pivotal movement between said duct sections must be accommodated by said second bearing and said second retainer portion; and
said retainer including a sleeve portion extending between said bearings and surrounding the end portions of the duct sections, said first retainer portion having a radially extending component, said last mentioned means includes a member mounted on said sleeve portion and having a flange portion projected generally toward said first duct section and being engageable therewith to limit said maximum relative pivotal movement of said first duct section relative to said retainer, said retainer also including a strut portion extending between said first retainer portion and said member whereby said member reinforces the retainer.

12. A coupling for interconnecting first and second duct sections adapted to carry fluid under pressure to thereby place the duct sections in tension comprising:
first and second bearing surfaces on the first and second duct sections, respectively;
a retainer including first and second circumferentially extending retainer surfaces engageable, respectively, with said first and second bearing surfaces to interconnect the duct sections, said retainer substantially circumscribing the duct sections, at least one of said surfaces being sloped whereby placing of the duct sections in tension tends to deform at least one end of the retainer;
seal means for sealing the region between the duct sections;
said retainer including first and second sections and first fastener means for hingedly joining the end portions of said first and second sections about a pivotal axis extending generally axially of the duct sections to thereby permit installation and removal of the retainer from the duct sections, said retainer including releasable fastener means for releasably interconnecting the opposite end portions of said sections, at least one of said fastener means including first and second fastener members mounted, respectively, on the first and second sections with portions of said fastener members being in confronting relationship axially outwardly of one of said retainer surfaces, said one fastener means including means for joining said portions of said fastener members whereby the strength of the retainer against deformation is improved; and said retainer including a first retainer portion defining said first retainer surface, said first retainer portion having a component extending radially of the first duct section whereby said retainer tends to bend outwardly in response to pressurization of the duct sections, said retainer also including a reinforcing member projecting axially outwardly of said retainer surface and a strut member extending between said reinforcing member and said first retainer portion to thereby reinforce said retainer.

13. A flexible coupling for interconnecting first and second duct sections wherein the duct sections are movable relative to each other, said coupling comprising:

first and second bearing surfaces on the first and second duct sections, respectively:

a retainer extending between said duct sections and having first and second retainer portions engageable with the first and second bearing surfaces, respectively, to retain said duct sections against axial separation;

seal means for sealing the region between the duct sections;

said first bearing surface and said first retainer portion being configured for relative slidable movement in a noncircumferential direction to thereby permit relative pivotal movement between said retainer and said first duct section about an axis which is generally transverse to the first duct section;

said second bearing surface and said second retainer portion being cooperable to permit relative pivotal movement between said retainer and said second duct section about an axis which is generally transverse to the second duct section; and means other than said retainer portion on at least one of said retainer and said first duct section for limiting the maximum amount of said relative pivotal movement between said retainer and said first bearing surface to an amount which can be safely accommodated by said relative slidable movement whereby further relative pivotal movement between said duct sections must be accommodated by said second bearing surface and said second retainer portion.

14. A coupling as defined in claim 13 wherein said last mentioned means includes a flange on said retainer projecting toward said first duct section and being engageable therewith at approximately the time at which said relative slidable movement brings the first retainer portion near the end of the first bearing surface.

15. A coupling for interconnecting first and second duct sections adapted to carry fluid under pressure to thereby place the duct sections in tension comprising:

first and second bearing surfaces on the first and second duct sections, respectively;

a retainer including first and second circumferentially extending retainer surfaces engageable, respectively, with said first and second bearing surfaces to interconnect the duct sections, said retainer substantially circumscribing the duct sections, at least one of said surfaces being sloped whereby placing of the duct sections in tension tends to deform the region of the retainer adjacent said one surface;

seal means for sealing the region between the duct sections; and said retainer including first and second sections and first fastener means for hingedly joining the end portions of said first and second sections about a pivotal axis extending generally axially of the duct sections to thereby permit installation installation and removal of the retainer from the duct sections, said retainer including releasable fastener means for releasably interconnecting the opposite end portions of said sections, at least one of said fastener means including first and second fastener members mounted, respectively, on the first and second sections adjacent said region of the retainer with confronting portions of said fastener members being in confronting relationship axially outwardly of the adjacent retainer surface, said one fastener means including means for joining said portions of said fastener members whereby the strength of the retainer against deformation is improved.

16. A coupling as defined in claim 15 wherein each of said first and second fastener members includes attachment portion fixed to its respective retainer section, said attachment section being rigidly joined to said confronting portion of the associate fastener member, each of said confronting portions projecting generally radially outwardly.